(12) United States Patent
Felip Leon et al.

(10) Patent No.: US 11,113,960 B2
(45) Date of Patent: Sep. 7, 2021

(54) INTELLIGENT TRAFFIC MANAGEMENT FOR VEHICLE PLATOONS

(71) Applicant: Intel Corporation, Santa Clara, CA (US)

(72) Inventors: Javier Felip Leon, Hillsboro, OR (US); Omar Florez, Sunnyvale, CA (US); David Gonzalez Aguirre, Hillsboro, OR (US); Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 239 days.

(21) Appl. No.: 15/941,515

(22) Filed: Mar. 30, 2018

(65) Prior Publication Data

US 2019/0051158 A1    Feb. 14, 2019

(51) Int. Cl.
| *G08G 1/01* | (2006.01) |
| *G05D 1/00* | (2006.01) |
| *G08G 1/00* | (2006.01) |

(52) U.S. Cl.
CPC ......... *G08G 1/0145* (2013.01); *G05D 1/0088* (2013.01); *G08G 1/0116* (2013.01); *G08G 1/22* (2013.01)

(58) Field of Classification Search
CPC .................................................. G08G 1/0145
USPC ....................................................... 701/118
See application file for complete search history.

(56) References Cited

U.S. PATENT DOCUMENTS

| 2004/0083037 A1* | 4/2004 | Yamane ............... G08G 1/0104 701/1 |
| 2008/0243350 A1 | 10/2008 | Harkness |
| 2008/0249667 A1* | 10/2008 | Horvitz ................. B60W 40/12 701/1 |
| 2010/0256852 A1* | 10/2010 | Mudalige ................ G08G 1/22 701/24 |
| 2012/0161982 A1 | 6/2012 | Musachio |
| 2013/0138320 A1 | 5/2013 | Aso |

(Continued)

FOREIGN PATENT DOCUMENTS

| DE | 102016006672 A1 * | 12/2016 |
| WO | 2017143591 | 8/2017 |

OTHER PUBLICATIONS

Google patents English translation of International Patent Application Pub. No. WO 2017-143591 A1 that published in 2017 (hereinafter "the 591 publication") (downloaded on Jan. 18, 2020).*

(Continued)

*Primary Examiner* — Jean Paul Cass
(74) *Attorney, Agent, or Firm* — Schwegman Lundberg & Woessner, P.A.

(57) ABSTRACT

Various systems and methods for implementing intelligent traffic management for vehicle platoons are described herein. A road controller system includes A road controller system comprising: a data store to store an active traffic policy; a processor subsystem to: determine a speed or platoon size of a vehicle platoon traveling on an area controlled by the road controller system; and determine a change to the speed or platoon size of the vehicle platoon, the change based on the active traffic policy; and a transceiver to transmit a control message to the vehicle platoon to implement the change to the speed or platoon size of the vehicle platoon.

22 Claims, 9 Drawing Sheets

(56) References Cited

U.S. PATENT DOCUMENTS

| | | | |
|---|---|---|---|
| 2017/0270785 A1 | 9/2017 | Umehara | |
| 2017/0293296 A1* | 10/2017 | Stenneth | G06Q 20/10 |
| 2017/0344023 A1* | 11/2017 | Laubinger | B60W 50/14 |
| 2019/0158408 A1* | 5/2019 | Li | H04L 45/306 |
| 2019/0232972 A1* | 8/2019 | Lin | G01C 25/00 |
| 2019/0364492 A1* | 11/2019 | Azizi | H04W 68/005 |
| 2019/0385450 A1* | 12/2019 | Kim | H04W 4/46 |
| 2020/0007661 A1* | 1/2020 | Kim | G08G 1/0116 |

OTHER PUBLICATIONS

Google Patents Machine Translation of DE102016006672A1.*

"International Application Serial No. PCT US2019 020071, International Search Report dated Jun. 14, 2019", 3 pgs.

"International Application Serial No. PCT US2019 020071, Written Opinion dated Jun. 14, 2019", 5 pgs.

Busse, Kai Timon, "Platooning on a string of intersections", TUDelft, (Aug. 2017), 147 pgs.

Castro, Pedro, "Optimal Scheduling of Pipeline Systems with a Resource-Task Network Continuous-Time Formulation", Ind. Eng. Chem. Res., 2010, 49 (22), (2010), 11491-11505.

Cornelius, W., "Emissions from Continuous Combustion Systems", Proceedings of the Symposium on Emissions from Continuous Combustion Systems held at the General Motors Research Laboratories, (1971).

Halonen, Jaana I., et al., "Is long-term exposure to traffic pollution associated with mortality? A small-area study in London", Environmental Pollution 208, (2016), 25-32.

Li, Shengbo Eben, et al., "Platoon Control of Connected Vehicles from a Networked Control Perspective: Literature Review, Component Modeling, and Controller Synthesis", DOI 10.1109/TVT.2017.2723881, IEEE Transactions on Vehicular Technology, (2017), 15 pgs.

Lioris, Jennie, et al., "Doubling throughput in urban roads by platooning", ScienceDirect IFAC-PapersOnLine 49-3, (2016), 6 pgs.

Milanes, Vicente, et al., "Cooperative Adaptive Cruise Control in Real Traffic Situations", IEEE Transactions on Intelligent Transportation Systems, vol. 15, No. 1, (Feb. 2014), 296-305.

Van Katwijk, Ronald T, et al., "Optimising a vehicle's approach towards an adaptively controlled intersection", IET Intelligent Transport Systems Special Issue on Energy Systems in Transport Systems and the Role of ITS, (2014), 9 pgs.

* cited by examiner

INTELLIGENT TRAFFIC MANAGEMENT FOR VEHICLE PLATOONS

TECHNICAL FIELD

Embodiments described herein generally relate to traffic management systems, and in particular, to intelligent traffic management for vehicle platoons.

BACKGROUND

Intelligent traffic management systems may be used to improve safety, traffic flow, and overall system efficiency. Traffic systems are typically implemented to reduce congestion, react to incidents that impact traffic flow, and provide insight into traffic patterns.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
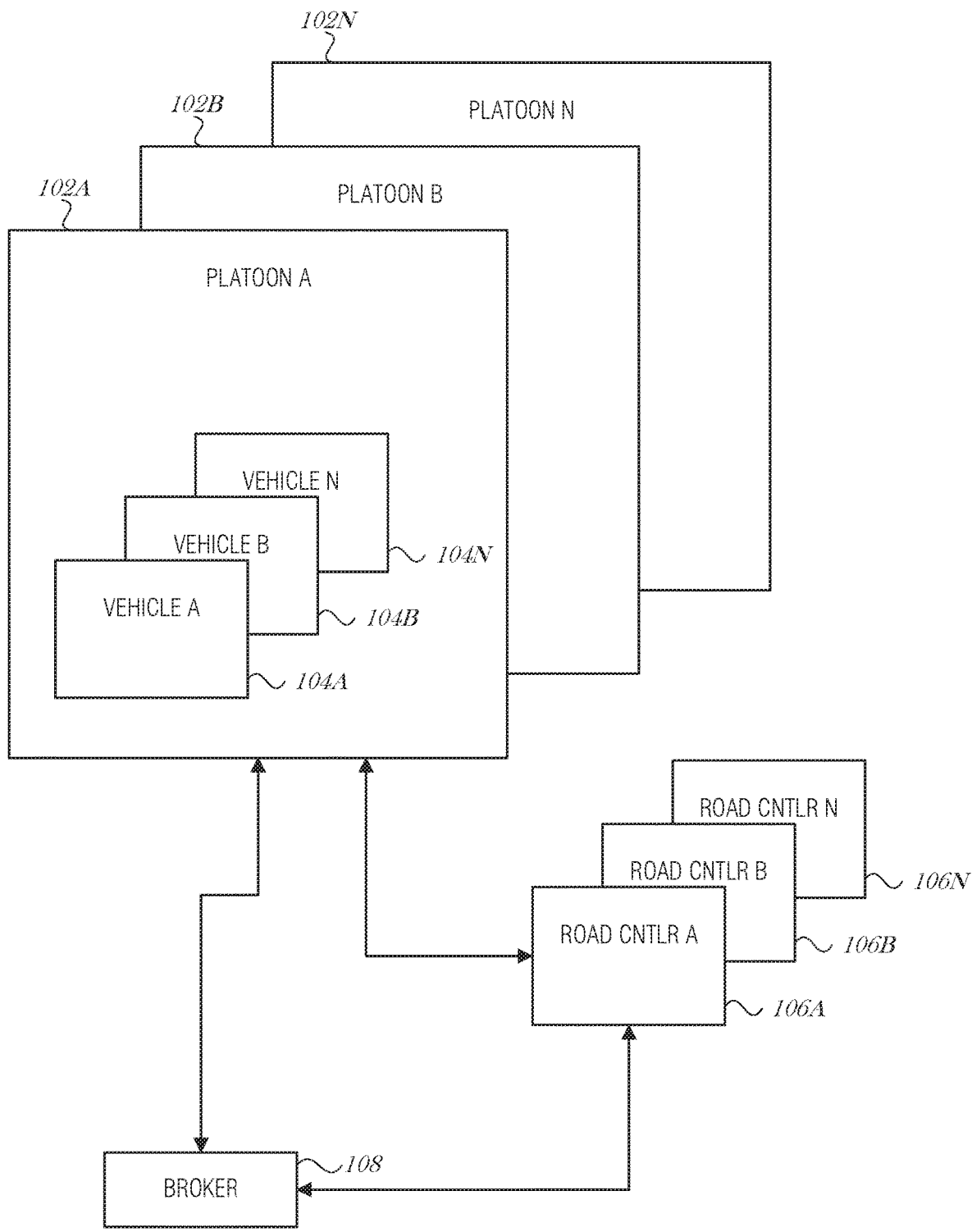
FIG. 1 is a block diagram illustrating a system for managing vehicle platoons, according to an embodiment.

In the following description, for purposes of explanation, numerous specific details are set forth in order to provide a thorough understanding of some example embodiments. It will be evident, however, to one skilled in the art that the present disclosure may be practiced without these specific details.

Autonomous vehicles (AVs) and autonomous driving will be available in the very near future. Fully autonomous driving may include aspects such as vehicle platoons. A vehicle platoon is a group of two or more vehicles that travel together as a single unit. Vehicle platoons may also be referred to as "convoys," "trains," or "road trains." With AVs that employ vehicle-to-vehicle (V2V) or infrastructure-to-vehicle (I2V) communication, platoons may safely travel with minimal gaps between each individual vehicle, which increases fuel efficiency and optimizes roadway throughput.

While some proposed implementations discuss the use of platooning in highway traffic, these implementations are designed for multi-lane highways and do not account for intersections. Extending platooning to be compatible with single-lane secondary roads enormously increases platoon management complexity. What is needed is intelligent platoon management for secondary roads, which typically include single-lane roadways with at-grade intersections.

In order to address this processing limitation, the present disclosure provides a hierarchical traffic management system with a road controller broker that manages several road controllers. Each road controller is configured to manage and control traffic on a section of a roadway. At the bottom of the hierarchy is a platoon, convoy, or road train of vehicles. The platoon is generally managed by the road controller, but may also have V2V or I2V signaling to maintain the platoon's size, speed, orientation, or other aspects.

A fixed communications beacon provides improved signal quality and makes communication more reliable; an important capability in this scenario. Moreover, having the planning algorithm centralized in the intersection road controller guarantees determinism, an important feature for validation and possible investigations. In contrast, with V2V communications based platoon intersection management, different platoons may implement different planning algorithms that may cause the intersection to be non-deterministic, increasing the complexity of safety evaluations.

Road controllers are configured to communicate with vehicles at the platoon level. One vehicle in a platoon may be designated the platoon leader and be the main point-of-contact of the road controller. Alternatively, the road controller may communicate with some or all of the vehicles in a platoon, simultaneously or concurrently.

Platoons communicate platoon attributes to the road controller that is in control of the road that the platoon is currently traversing or of a roadway that the platoon is scheduled to traverse. Based on the platoon information, the road controller may dynamically manage platoons to avoid bottlenecks at intersections, maximize an overall average speed, minimize travel times, or the like, for platoons under the road controller's scope.

Thus, in an improved traffic management system, platoons are controlled to provide overall system efficiencies. Additional embodiments are described below with reference to the FIGS.

FIG. 1 is a block diagram illustrating a system 100 for managing vehicle platoons, according to an embodiment. The system 100 includes a number of vehicle platoons 102A-N, with each platoon 102A-N including a number of vehicles 104A-N. A platoon 102 may include one or more vehicles 104A-N. Some platoons 102A-N may include a relatively small number of vehicles 104A-N, such as four vehicles, while other platoons 102A-N may include a relatively large number of vehicles 104A-N, such as thirty. Vehicles 104A-N may include partially or fully autonomous vehicles (AVs).

AVs typically include various forward, sideward, and rearward facing sensors in a vehicle. The sensors may include radar, LiDAR (light imaging detection and ranging), cameras, ultrasound, infrared, or other sensor systems. Front-facing sensors may be used for adaptive cruise control, parking assistance, lane departure, collision avoidance, pedestrian detection, and the like. Rear-facing sensors may be used to alert the driver of potential obstacles (e.g., vehicles) when performing lane changes or when backing up at slow speeds (e.g., parking distance monitors).

AVs may be partially or fully autonomous and may operate in a partial or full autonomous mode for some or all of the time. Partial autonomous mode may provide various collision avoidance, driver alert systems, lane change warnings, and the like. In contrast, full autonomous mode may relieve the driver from nearly all operational aspects. Modes may be changed during a driving session. For instance, a driver may operate an AV in partial autonomous mode while in the city, and then initiate full autonomous operation after reaching a stretch of highway.

The size of the platoon 102A-N may be controlled by a road controller 106A-N or a broker 108. The size of the platoon 102A-N may be measured by the number of vehicles 104A-N, the length of the platoon, or other metrics.

Each road controller 106A-N is configured, programmed, allocated, or otherwise adapted to manage a portion of a roadway or traffic structure. The roadway may include an intersection, straight road, on ramp, off ramp, curve, or the like. The traffic structure may include bridges, tunnels, railroad crossings, or the like. A road controller 106A-N may manage one or more roadway portions. Additionally, or alternatively, the road controller 106A-N may manage one or more traffic structures.

The broker 108 is used to manage the road controllers 106A-N. While only one broker 108 is illustrated in FIG. 1, it is understood that multiple brokers may be used to address national, regional, or other geographic or legal boundaries. For example, one broker may be used for road controllers in California, while another broker may be used for road controllers in Utah and Nevada. Multiple brokers may also be used to load balance over some or all of the same road controllers 106A-N.

Figure 2:
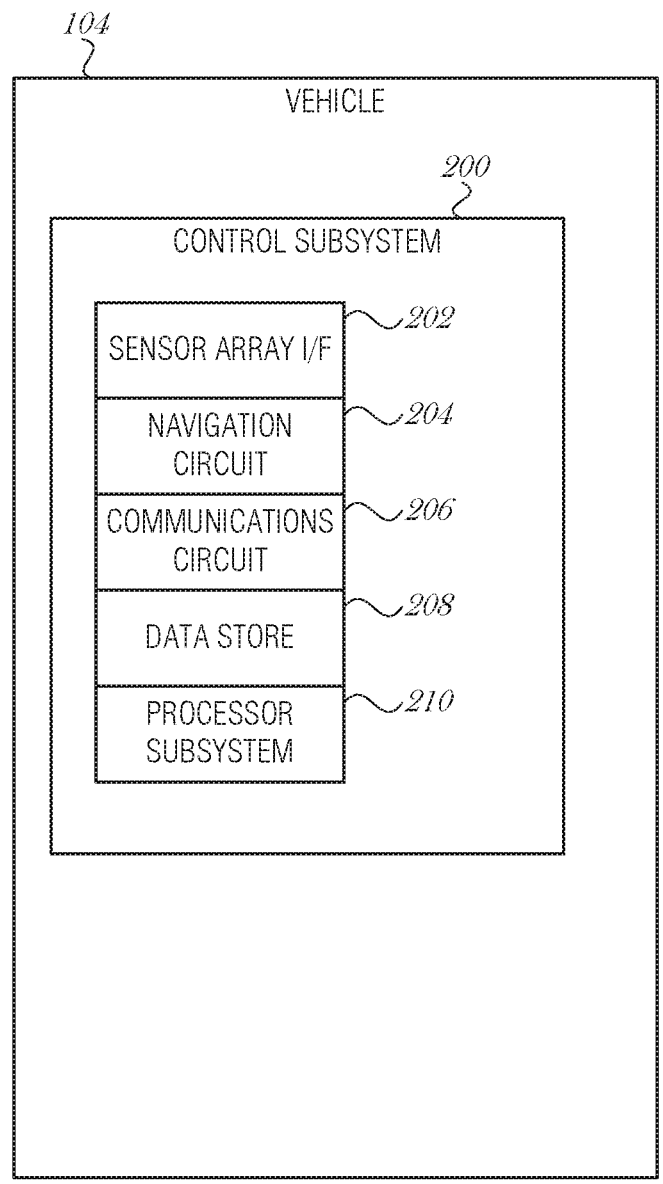
FIG. 2 is a schematic drawing illustrating a vehicle, according to an embodiment.

FIG. 2 is a schematic drawing illustrating a vehicle 104, according to an embodiment. FIG. 2 includes a control subsystem 200 incorporated into the vehicle 104. The control subsystem 200 includes a sensor array interface 202, a navigation circuit 204, a communications circuit 206, a data store 208, and a processor subsystem 210.

The vehicle 104 may be of any type of vehicle, such as a commercial vehicle, a consumer vehicle, a recreation vehicle, a car, a truck, a motorcycle, a boat, a drone, a robot, an airplane, a hovercraft, or any mobile craft able to operate at least partially in an autonomous mode. The vehicle 104 may operate at some times in a manual mode where the driver operates the vehicle 104 conventionally using pedals, steering wheel, and other controls. At other times, the vehicle 104 may operate in a fully autonomous mode, where the vehicle 104 operates without user intervention. In addition, the vehicle 104 may operate in a semi-autonomous mode, where the vehicle 104 controls many of the aspects of driving, but the driver may intervene or influence the operation using conventional inputs (e.g., steering wheel) and non-conventional inputs (e.g., voice control).

The vehicle 104 includes a sensor array, which may include various forward, side, and rearward facing cameras, radar, LiDAR, ultrasonic, or similar imaging sensors. Forward-facing is used in this document to refer to the primary direction of travel, the direction the seats are arranged to face, the direction of travel when the transmission is set to drive, or the like. Conventionally then, rear-facing or rearward-facing is used to describe sensors that are directed in a roughly opposite direction than those that are forward or front-facing. It is understood that some front-facing camera may have a relatively wide field of view, even up to 180-degrees. Similarly, a rear-facing camera that is directed at an angle (perhaps 60-degrees off center) to be used to detect traffic in adjacent traffic lanes, may also have a relatively wide field of view, which may overlap the field of view of the front-facing camera. Side-facing sensors are those that are directed outward from the sides of the vehicle 104. Cameras in the sensor array may include infrared or visible light cameras, able to focus at long-range or short-range with narrow or large fields of view.

The vehicle 104 may also include various other sensors, such as driver identification sensors (e.g., a seat sensor, an eye tracking and identification sensor, a fingerprint scanner, a voice recognition module, or the like), occupant sensors, or various environmental sensors to detect wind velocity, outdoor temperature, barometer pressure, rain/moisture, or the like.

Components of the control subsystem 200 may communicate using a network, which may include local-area networks (LAN), wide-area networks (WAN), wireless networks (e.g., 802.11 or cellular network), the Public Switched Telephone Network (PSTN) network, ad hoc networks, personal area networks (e.g., Bluetooth), vehicle-based networks (e.g., Controller Area Network (CAN) BUS), coaxial cable, or other combinations or permutations of network protocols and network types. The network may include a single local area network (LAN) or wide-area network (WAN), or combinations of LANs or WANs, such as the Internet. The various devices coupled to the network may be coupled to the network via one or more wired or wireless connections.

The communications circuit 206 may be configured with one or more transceivers and radios to communicate with a road controller, broker, or other vehicles. The communication circuit 206 may also provide communication for the navigation circuit, for instance, to capture satellite tracking signals.

In operation, the vehicle 104 obtains sensor data via the sensor array interface 202 from sensors integrated in the vehicle 104, or sensors that are communicatively coupled to the vehicle 104. The sensors may include radar, LiDAR, visible light cameras, acoustic sensors, environmental sensors, infrared sensors, or combinations. Radar is useful in nearly all weather and longer range detection, LiDAR is useful for shorter range detection, cameras are useful for longer ranges but often become less effective in certain weather conditions, such as snow. Combinations of sensors may be used to provide the widest flexibility in varying operating conditions.

The navigation circuit 204 may include or be communicatively coupled with a positioning unit, such as a GPS unit, to provide geolocation and related services. The navigation circuit 204 may interface with driving controls of the vehicle 104 to provide steering, braking, or other operations control of the vehicle 104.

The data store 208 may be volatile or non-volatile memory. For example, the data store 208 may include read-only memory (ROM), random-access memory (RAM), magnetic disk storage media, optical storage media, flash-memory devices, and other storage devices and media. Various components of the control subsystem 200 may store data in the data store 208. The processor subsystem 210 may use the data store 208.

In operation, the vehicle 104 is able to receive messages from a broker, another vehicle, or a road controller to join or split from a platoon, increase or decrease speed, or otherwise operate according to one or more policies set by the road controller or the broker. Before and after the vehicle 104 is in the platoon, the vehicle may be operated manually by the driver of the vehicle 104. While the vehicle 104 is travelling in the platoon, the vehicle 104 may be largely autonomous.

Figure 3:
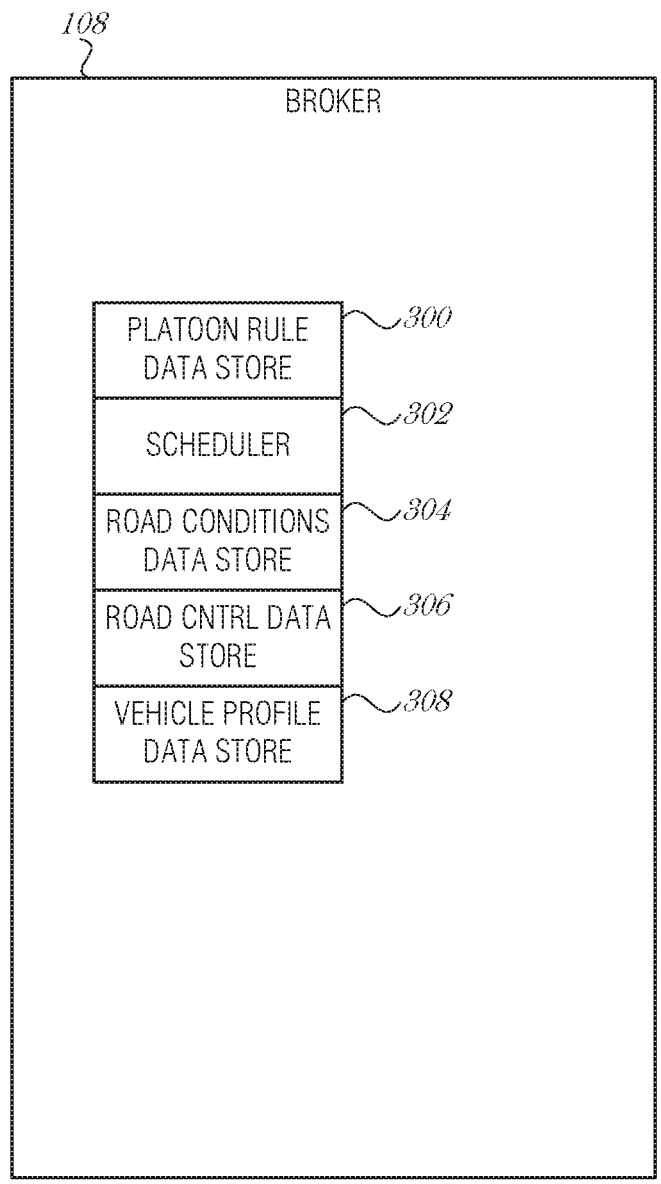
FIG. 3 is a is a schematic drawing illustrating a broker, according to an embodiment.

FIG. 3 is a is a schematic drawing illustrating a broker 108, according to an embodiment. The broker 108 is used to control the policies of road controllers under the broker's control. In an embodiment, the broker 108 maintains an index of the road controllers that are in charge of specific regions of the traffic control system. When a platoon is about to exit the area of one road controller, the platoon requests the broker for the next road controller that it should connect with. Road controller brokers may be hierarchically scaled up to handle the whole earth road network. The broker 108 and road controllers may share data, such as information about road conditions, traffic congestion, road use, or the like.

The broker 108 includes a platoon rule data store 300, a scheduler 302, a road conditions data store 304, a road controller data store 306, and a vehicle profile data store 308.

The platoon rule date store 300 may be arranged as a database, a list of descriptive rules, a rule decision tree, or the like. The platoon rule date store 300 includes rules and policies that describe how platoons should act in various geographic locations in certain contexts. The contexts may include time, weather, traffic congestion, road conditions, or the like. Based on these, or other, contextual inputs, the platoon rule date store 300 provides a maximum platoon size (e.g., in feet from the front of the first vehicle to the end of the last vehicle in the platoon), a following distance within the platoon (e.g., vehicle-to-vehicle distance, from the front of a following vehicle to the rear of a leading vehicle), a lead distance between platoons, a platoon speed, a communication protocol to use within a platoon or between platoons, and other features of platoon operation.

The scheduler 302 communicates with the road controllers to assist in maintaining a consistent traffic flow from one road controller's domain to the next road controller domain. While the road controller is able to manage platoon operation within its domain, the road controller may not know the road or traffic conditions of adjacent road controllers, and when the platoon moves from one road controller to the next, the platoon may be forced to change operation. In general, the scheduler 302 attempts to perform high-level management to minimize platoon malfunctions and implement high-level traffic control policies. For example, the scheduler 302 may be used to change the priority of the traffic flowing through a specific lane of a road that expands across multiple road controllers ensuring a coordinated and coherent high-level traffic management through all the road controllers that the broker 108 controls. This schema may be replicated hierarchically to create a network of brokers 108 that expand their control beyond the influence of a single broker 108. Road controllers are provided information about the state of a platoon (e.g., speed, weight), allowing the road controller to take into consideration the dynamics of the platoon when sending commands and estimating the acceleration or deceleration that the vehicles are able to safely and comfortably execute.

The road conditions data store 304 is used to store various indicators of road conditions, such as traffic congestion, road disrepair, weather issues, or the like. The road conditions data store 304 may be populated and updated by external services, such as a traffic monitoring service or a weather tracking service.

The road controller data store 306 includes details of the road controllers in the domain of the broker 108. The road controller data store 306 may include all of the road controllers in the universe of road controllers, for instance, all of the controllers in the country where the particular broker is only managing one area of the country. Alternatively, the road controller data store 306 may only include the road controllers under the broker's control.

The vehicle profile data store 308 is used to store information about the individual vehicle state that may be used to obtain the aggregated information used to determine the platoon state, which is used by the road controllers to make decisions. Data in the vehicle profile data store 308 may include vehicle weight and acceleration limits, for example. It may also include other useful information like wheel size, number of passengers, or cargo weight.

Figure 4:
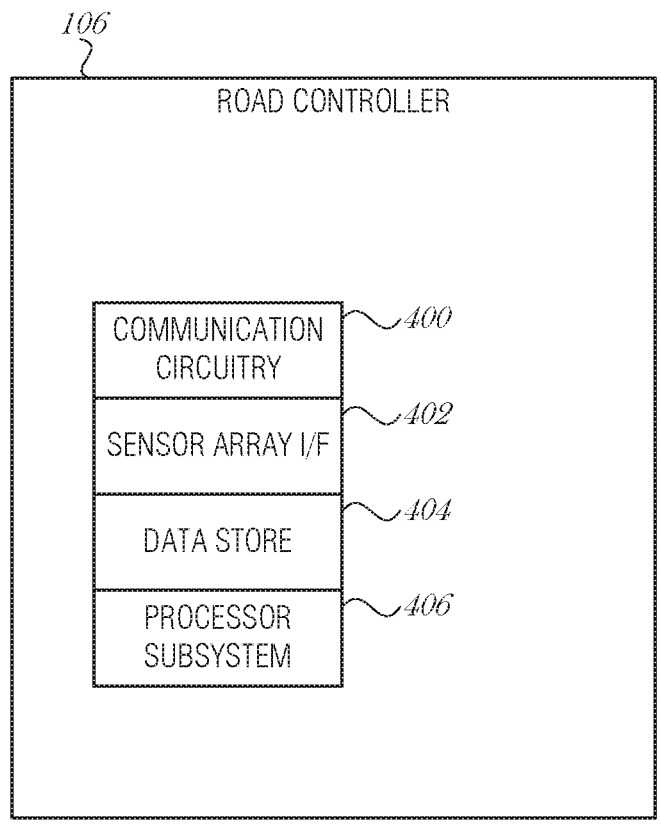
FIG. 4 is a is a schematic drawing illustrating a road controller, according to an embodiment.

FIG. 4 is a is a schematic drawing illustrating a road controller 106, according to an embodiment. The road controller 106 is used to control the policies of a certain road section or traffic structure. The road controller 106 keeps track of the road status of a determined area and which platoons are in its domain. Every time a platoon enters the road controller's domain, the platoon reports its state to the road controller 106 (e.g., position, velocity, and number, size, and mass of each of the vehicles). If a given road controller 106 cannot communicate with the central broker 108, the road controller 106 uses a default set of autonomous rules. Some of the rules may be oriented around platoon safety. For instance, if the road controller 106 has uncertainty about particular variables, such as status of a bridge, it may send messages to a platoon to disperse. The platoon may then split and each vehicle in the platoon may operate independently. Operators of the vehicles may then decide whether to continue across the bridge or to select an alternative route.

The road controller 106 includes communication circuitry 400, a sensor array interface 402, a data store 404, and a processor subsystem 406. The communication circuitry 400 is used to communicate with the broker 108, platoons 102A-N, or vehicles 104A-N, which may be operating within a platoon 102A-N or separate from one.

The sensor array interface 402 provides an interface between one or more sensors and the processor subsystem 406. The sensor array may have sensors that are installed or incorporated into the road controller 106. Alternatively, the sensor array may include sensors that are communicatively coupled to the road controller 106 (e.g., over a wired connection, a wireless network connection, or the like). Sensors include, but are not limited to, sensing devices and systems such as a thermometer, a humidity sensor, a rain sensor, a camera, a microphone, a pressure sensor, a weight scale, an air pollution sensor, or the like. The sensor interface 402 or processor subsystem 406 is able to receive signals and data from the sensor array, and use the data to determine the environmental context around the road controller 106.

The environmental context may include the number or type of vehicles 104A-N in a platoon 102A-N, the number or type or platoons 102A-N in the controller road or traffic structure, the weather, the road conditions, the amount of air pollution, the time of day, and other contextual information. Some or all of the environmental context information may be stored in the data store 406.

The data store 404 may also store rules or policies for platoons on the controlled road or traffic structure. The rules or policies may be stored as a decision tree, a series of one or more conditional statements, or the like.

When a platoon 102A-N enters an area (e.g., road or traffic structure) controlled by the road controller 106, the platoon 102A-N and road controller 106 establish a communication channel. The platoon 102A-N provides details about the platoon 102A-N to the road controller 106. The details may be information such as a number of vehicles 104A-N in the platoon 102A-N, a mass of the vehicles 104A-N in the platoon 102A-N, a length of the vehicles 104A-N in the platoon 102A-N, a type of platoon 102A-N, a priority of the platoon 102A-N, or the like.

Using this information, the road controller 106 may provide one or more control messages to the platoon 102A-N. Control messages may include directives such as setting an acceleration profile, setting a speed of the platoon 102A-N, splitting the platoon 102A-N at a certain vehicle 104A-N, joining platoons 102A-N, and other actions.

The road controller 106 may provide control messages based on its own policies and rules stored in the data store 404. Additionally, or alternatively, the road controller 106 may use policies or rules provided by the broker 108. In an embodiment, the road controller 106 may use a policy provided by the broker 108 and in situations when the broker 108 is unavailable, the road controller 106 may use default policies stored at the road controller 106.

Figure 5:
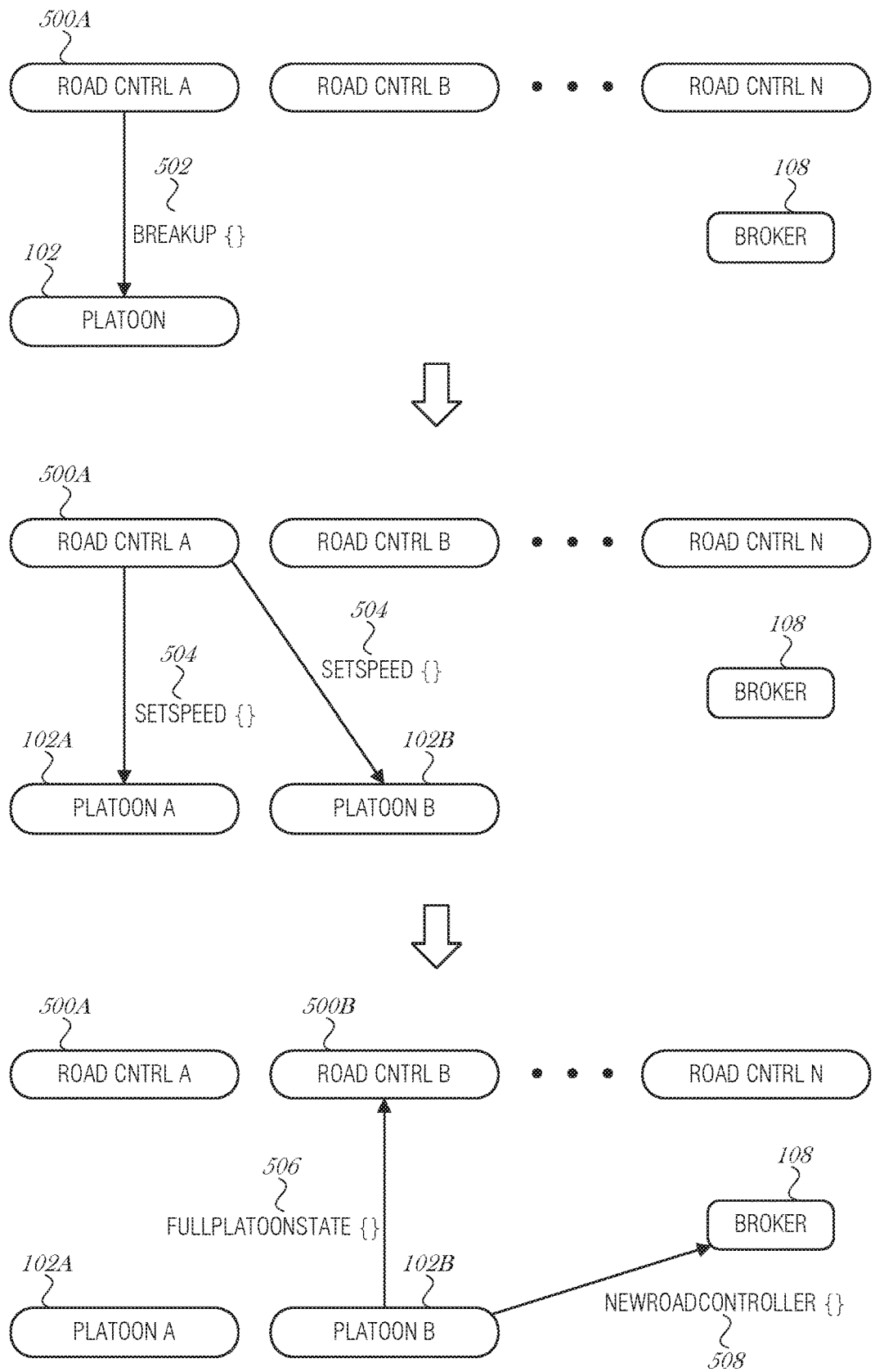
FIG. 5 is a block diagram illustrating road controller control messages, platoon status messages, and broker control messages, according to an embodiment.

FIG. 5 is a block diagram illustrating road controller control messages, platoon status messages, and broker control messages, according to an embodiment. A platoon 102A-N transmits one or more status messages to a road controller 106 before and during the time the platoon 102A-N is operating on the road or traffic structure controlled by the road controller 106. The status messages may include metrics, such as how many or what type of vehicles are in the platoon 102A-N, how fast the platoon 102A-N is travelling, or the like. Function prototypes for an application programming interface (API) are included here.

Each platoon 102A-N may be assigned a globally unique identifier, which is passed in the various status messages. The identifier may be a numeric, alphanumeric, or the like. The identifier may be encrypted, such as with the platoon's private key, so that the receiving road controller 106 may confirm the authenticity of the status message using a certificate authority and a signed copy of the platoon's public key.

An example of a status message is PlatoonStaticState (platoon_ID, num_of_vehicles, vehicle_info). The PlatoonStaticState ( ) status message provides the number of vehicles in the platoon 102A-N and the vehicle information of each vehicle in the platoon 102A-N. The vehicle information may be a data structure, such as a linked list, array, or other object, to pass the information of several vehicles. The information may include statistics and metrics including vehicle weight, size, maximum speed, acceleration limits, road restrictions, hazardous material alerts, or the like. The PlatoonStaticState ( ) message may be passed before the platoon 102A-N enters the controlled area, or just after the platoon 102A-N has entered. The PlatoonStaticState ( ) message may then be transmitted when there is a change in the composition of the platoon 102A-N. This information may be used by the road controller 106 to navigate the platoon 102A-N through the road or traffic structure.

Another example of a status message is PlatoonDynamicState (platoon_ID, velocity, acceleration). The PlatoonDynamicState( ) status message provides instantaneous information of the platoon's operating state. The PlatoonDynamicState( ) message may be passed frequently, such as every half second, to provide up-to-date information to the road controller 106.

Another example of a status message is FullPlatoonState (platoon_ID, num_of_vehicles, vehicle_info, velocity, acceleration). The FullPlatoonState( ) status message provides all of the information about the platoon 102A-N associated with the platoon_ID. This includes the information passed in the PlatoonStaticState( ) message and the information passed in the PlatoonDynamicState( ) message. The FullPlatoonState( ) message may include more information as well.

The broker 108 may communicate with a platoon 102A-N using various control or status messages. The platoon 102A-N may send the broker 108 a status message NewRoadController (platoon_ID, road_controller_ID, velocity), where the platoon_ID is the unique identifier of the platoon 102A-N, the road_controller_ID is the unique identifier of a newly recognized road controller 106 under which the platoon 102A-N is operating, and the velocity is the velocity of the platoon 102A-N.

To control platoons 102A-N in its domain, the road controller 106 transmits various control messages. The control messages may be transmitted to a single platoon 102A-N or broadcast to several or all platoons 102A-N in the road controller's domain. The road controller 106 transmits control messages to carry out and maintain traffic based on policies. The policies may be obtained or provided by the broker 108 that coordinates the road controller 106. Alternatively, the road controller 106 may use local policies, such as when the broker 108 is unavailable.

Each of the control messages transmitted by a road controller 106 include a globally unique identifier assigned to the particular road controller 106. The identifier may be a numeric, alphanumeric, or the like. The identifier may be encrypted, such as with the road controller's private key, so that the receiving platoon 102A-N may confirm the authenticity of the control message using a certificate authority and a signed copy of the road controller's public key.

An example of a control message is Breakup(road_controller_ID, vehicle_index). The Breakup( ) control message is used to break apart an existing platoon 102A-N. The vehicle_index parameter is used to indicate where the break should happen. For example, when using a zero based counting system, where the first vehicle is "vehicle 0", a message of Breakup(01234, 3) would cause the platoon 102A-N to split at the fourth vehicle (vehicle 3). Depending on the agreed upon behavior, the split vehicle (e.g., vehicle 3) may be the new head of the following split platoon, or the tail of the lead platoon. In an example, the vehicle identified by the vehicle_index is the one to become the new head of the split off platoon 102A-N. Thus, in such an embodiment, consistent with the example, the fourth vehicle would become the new lead vehicle of the trailing platoon 102A-N.

Another example of a control message is SetSpeed(road_controller_ID, speed). The SetSpeed( ) control message provides a target speed for the platoon 102A-N. The speed may be in any units, such as miles/hour (mph) or kilometers/hour (km/h). Once the platoon 102A-N receives the control message, it begins to accelerate or decelerate as a unit.

Another example of a control message is SetAccelerationProfile(road_controller_ID, accel_profile). The SetAccerlationProfile( ) control message provides an accel_profile parameter. The accel_profile may be a value, such as an index of an acceleration profile that the platoon 102A-N may look up and determine the corresponding settings. Alternatively, the accel_profile may be a numerical value indicating a threshold acceleration that the platoon 102A-N is to use when accelerating. For instance, the accel_profile may be the value "3.5 m/s/s" indicating that the platoon 102A-N should not accelerate any faster than 3.5 $m/s^2$.

Using these control messages, the road controller 106 is able to increase or decrease the distance between platoons 102A-N, split and join platoons 102A-N. and otherwise manage platoon traffic.

Returning to the discussion of FIG. 5, a platoon 102 may be operating on a road controlled by road controller 500A. To maintain more consistent traffic flow according to the current policy, the road controller 500A may instruct the platoon 102 to break apart into platoon 102A and platoon 102B, using control message 502. The road controller 500 may further instruction both of the new platoons 102A-B to travel at a certain speed using control message 504. As the platoon 102B leaves the road controlled by road controller 500A and enters the road controlled by road controller 500B, the platoon 102B transmits a FullPlatoonState( ) status message 506 to the new road controller 500B. Additionally, the platoon 102B may transmit a status message 508 to the broker 108. This way, the broker 108 is able to keep track of how many platoons 102A-N, and even vehicles 104A-N, are in the domain of each road controller 106.

Figure 6:
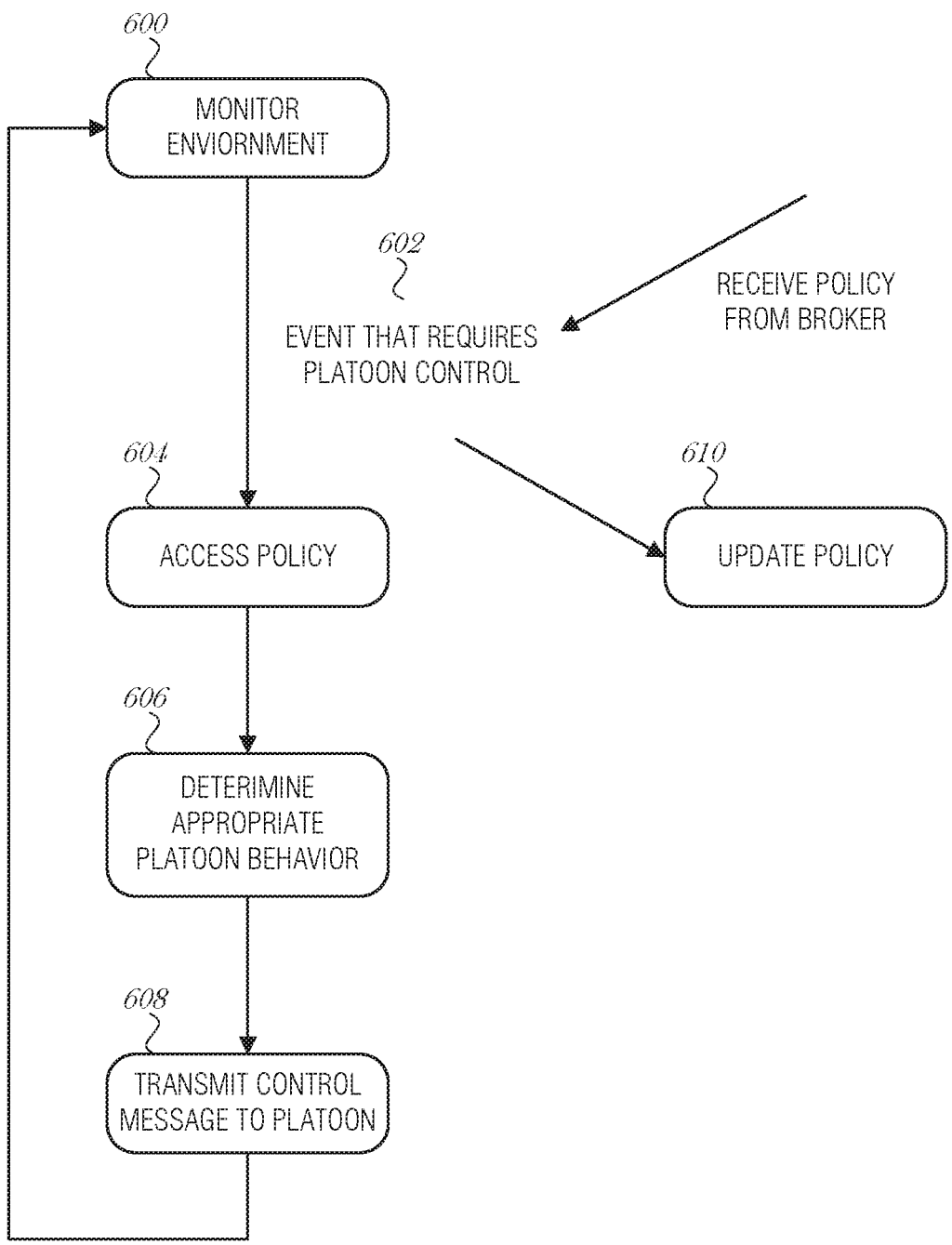
FIG. 6 is a data and control flow diagram illustrating the various states that may exist during interaction between a platoon and other components in a traffic management system, according to an embodiment.

FIG. 6 is a data and control flow diagram illustrating the various states that may exist during interaction between a platoon and other components in a traffic management system, according to an embodiment. A road controller monitors the area controlled by the road controller (operational state 600). The monitoring may be performed by direct measurement or indirect measurement. For instance, the road controller may include various sensors, such as a camera, a thermometer, a barometer, or the like, to detect objects and conditions in the immediate environment. Alternatively, the road controller may receive measurements from another system, resulting in an indirect measurement. The other system may be a weather monitoring system, a vehicle travelling on the road, a separate traffic monitoring system, or the like. The road controller may receive, store, analyze, and otherwise manage the monitoring data.

When an event that requires platoon control 602 is detected or received at the road controller, the road controller accesses a policy (operation 604), determines an appropriate platoon behavior for at least one platoon in the area controlled by the road controller (operation 606), and transmits a control message to the platoon or platoons to initiate the behavior (operation 608).

The event that requires platoon control 602 may be various events, including sensing a traffic situation by the road controller, receiving a status message from a platoon entering the area controlled by the road controller, receiving a control message from a broker that controls the road controller, identifying or detecting a road condition or environmental change, or the like.

The traffic situation may be based on various causes, such as traffic congestion, a traffic accident, a fallen tree or other obstacle, etc. Based on the traffic situation, the road controller may re-route traffic, decrease or increase speeds of platoons, break apart or join platoons, or the like.

When a platoon enters the controlled area, it transmits a status message to the road controller. The status message includes the attributes of the entering platoon. Based on the attributes of the platoon, the road controller may adjust various traffic patterns, traffic load, speed, or other aspects of the platoon or other platoons in the controlled area.

In another situation, a broker may send a message to the road controller. The message may include a policy update to change the behavior of the road controller when managing the platoons. If the road controller receives a policy update, then the active policy may be updated (operation 610) and stored.

Based on the event the road controller processes accesses the active policy. In an embodiment, the active policy may be obtained from the broker at each access operation (operation 604). This operational model ensures that the road controller is using the most recent version of the policy. Alternatively, the active policy may be stored at the road controller and updated regularly (operation 610).

The road controller may also maintain a default policy. The default policy may be a relatively conservative policy to ensure that traffic flows, but it may not be optimized or designed with a specific intent. In the case where the road controller access the policy directly from the broker, the default policy may be activated when the broker is unavailable. In other cases, the default policy may be activated in other instances, such as when the active policy does not have an entry for the current time slot.

In operation 606, the road controller determines the appropriate behavior based on the active policy. The appropriate behavior may include actions like, slowing down a platoon to reduce noise pollution, increasing a platoon's speed to reduce travel time or increase traffic throughput, splitting platoons to reduce air pollution concentration, or the like. The appropriate behavior is dependent on the type and number of platoons operating in the controlled area, the time of day, the day of week, restrictions on roadway use (e.g., school hours), accidents or other emergent incidents, pollution control, weather, and the like. A rule system may be used to determine how each platoon in the controlled area should act. A machine-learning system may be used as well.

Based on the determined behavior, the road controller may send one or more control messages to one or more platoons in the controlled area (operation 608). The control messages may be sent point-to-point, individually to each platoon. Alternatively, the control messages may be broadcasted to all platoons in the controlled area.

In an example, the road controller may be in control of a roadway that passes through a residential area. In order to reduce noise pollution, the size of platoons for the controlled residential area may be reduced to effectively reduce the amount of noise produced by the passing vehicles. Additionally, the time between platoons may be increased so that platoons are not constantly passing through. The active policy may provide a maximum decibel sound level for the area and the road controller may monitor the sound levels and adjust the number or size of platoons based on the readings. The maximum sound levels may be associated with time slots. For instance, during a 10:00 PM to 6:00 AM period, the maximum sound level may be much lower than during a 6:00 AM to 9:00 AM period. When the road is a bi-directional road, the platoons from each direction may be reduced in size or frequency.

Figure 7:
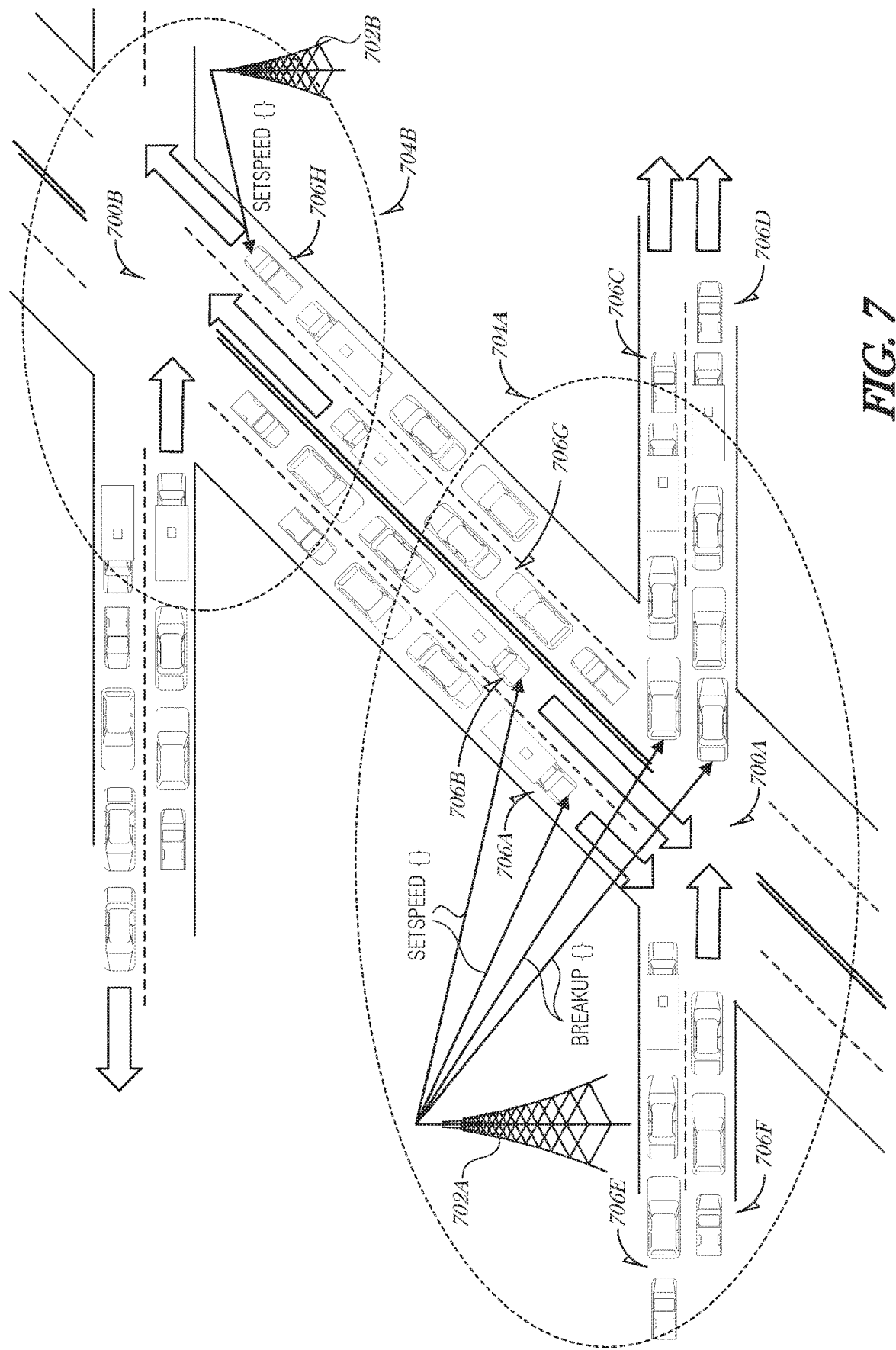
FIG. 7 is a schematic diagram illustrating controlled intersections, according to an embodiment.

FIG. 7 is a schematic diagram illustrating controlled intersections, according to an embodiment. FIG. 7 includes two intersections 700A and 700B. Each intersection 700A-B is controlled by a respective road controller 702A and 702B. A number of platoons are controlled by the road controllers 702A-B. Each road controller 702A-B controls a non-overlapping area. In the example illustrated in FIG. 7, road controller 702A controls area 704A, and road controller 702B controls area 704B. The area 704A roughly corresponds with intersection 700A, and area 704B roughly corresponds with intersection 700B. As a result, road controller 702A is understood to control the traffic structure intersection 700A and the corresponding roadways. Similarly, road controller 702B is understood to control the traffic structure intersection 700B and the corresponding roadways.

As platoons 706A and 70B approach the intersection 700A controlled by road controller 702A, road controller 702A may transmit a SetSpeed(25) control message to the platoons 706A-B to have the platoons change their speed to 25 miles per hour. The road controller 702A may determine that the platoons 706A-B have a higher priority than platoons 706C-D. and therefore should have right of way at the intersection 700A. As a result, the road controller 702A may also transmit Breakup(5) and Breakup(4) control messages to respective platoons 706C and 706D, causing them to break apart with the fifth vehicle becoming the tail of platoon 706C and the fourth vehicle becoming the tail of platoon 706D. Additionally, the road controller 702A may transmit a SetSpeed(0) control message to the newly created trailing platoons 706E and 706F, which were created by the Breakup( ) messages. The SetSpeed(0) control message causes the platoon 706E-F to come to a stop. Control systems in the vehicles of the platoons 706E-F may cause the platoon 706E-F to stop before an intersection, so it does not block the cross traffic.

Road controller 702B may transmit a SetSpeed(55) control message to platoons 706G and 706H because the platoons 706G-H are entering a more open roadway with a higher allowable speed (e.g., a highway or interstate roadway).

The road controllers 702A-B operate with an overarching policy that is provided a broker (not shown). The policy may be to optimize the traffic flow throughput of the bi-directional highway, and minimize the wait times at intersections 700A-B. Because of the platoon-level management provided by the road controllers 702A-B, there is less wait time for stopped traffic, and more optimized road usage overall.

Figure 8:
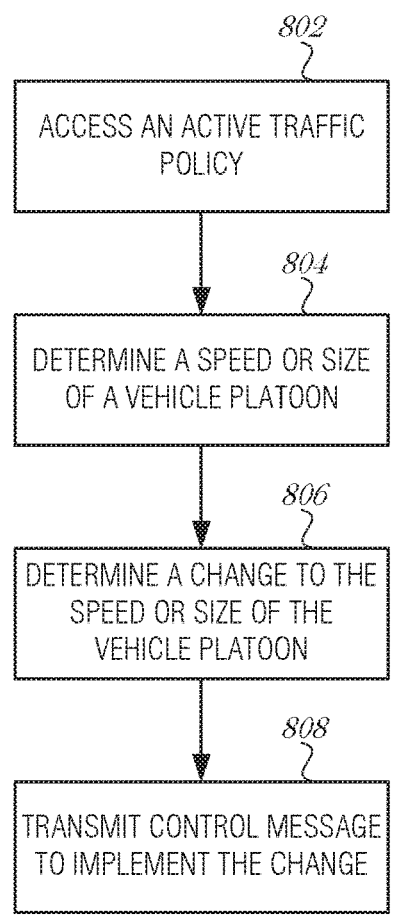
FIG. 8 is a flowchart illustrating a method for operating a road controller, according to an embodiment.

FIG. 8 is a flowchart illustrating a method 800 for operating a road controller, according to an embodiment. At 802, an active traffic policy is accessed.

At 804, a speed or platoon size of a vehicle platoon traveling on an area controlled by the road controller system is determined. This may be determined, for example, with a status message that is transmitted to the road controller from a lead vehicle in the platoon. Alternatively, the road controller may receive this information from a broker. As yet another alternative, the road controller may sense or detect this information directly, for instance, using image capture devices and image analysis.

At 806, a change to the speed or platoon size of the vehicle platoon is determined, the change based on the active traffic policy. The active traffic policy may dictate a change to at least one of a size or speed of a platoon to ensure various environmental constraints, for example.

At 808, a control message is transmitted to the vehicle platoon to implement the change to the speed or platoon size of the vehicle platoon. This may be performed using one or more control messages.

In an embodiment, the active traffic policy is updated from a road controller broker.

In an embodiment, the method 800 includes determining that the road controller broker is unavailable and activating a default policy when the road controller broker is unavailable.

In an embodiment, the active traffic policy is managed by the road controller system.

In an embodiment, the method 800 includes accessing the active traffic policy from a road controller broker, the road controller broker controlling a plurality of road controllers including the road controller system.

In an embodiment, the active traffic policy includes rules to control traffic in a residential area to reduce noise pollution of vehicle platoons operating in the residential area.

In an embodiment, the method 800 includes receiving sensor data from a sensor array interface incorporated in the road controller system. In a further embodiment, the sensor data includes weather data, and wherein determining the change to the speed or platoon size of the vehicle platoon comprises using the weather data to determine the change. In another embodiment, the sensor data includes road condition data, and wherein determining the change to the speed or platoon size of the vehicle platoon comprises using the road condition data to determine the change.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hard-wired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

As used in any embodiment herein, the term "logic" may refer to firmware and/or circuitry configured to perform any of the aforementioned operations. Firmware may be embodied as code, instructions or instruction sets and/or data that are hard-coded (e.g., nonvolatile) in memory devices and/or circuitry.

Figure 9:
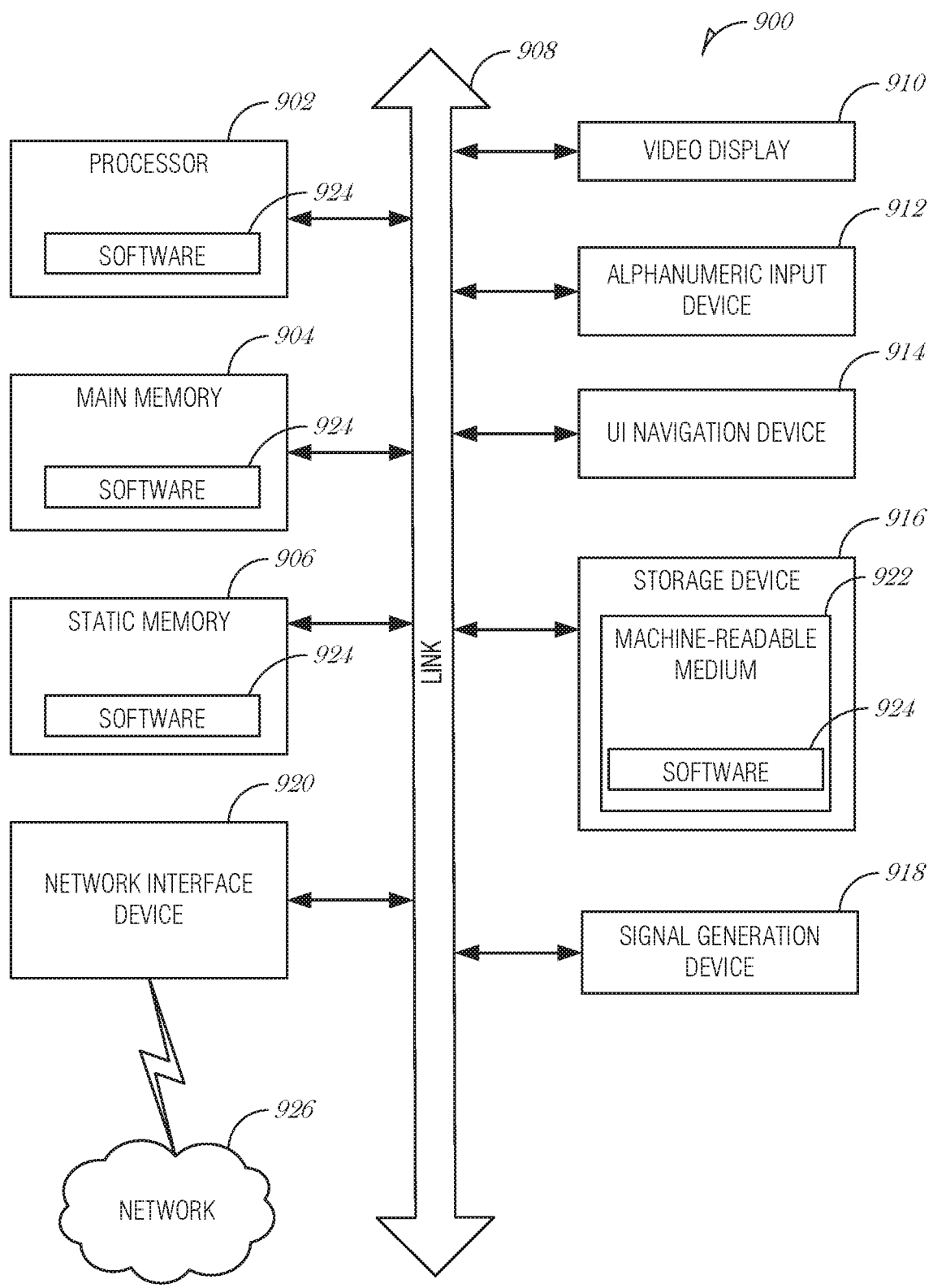
FIG. 9 is a block diagram illustrating an example machine upon which any one or more of the techniques (e.g., methodologies) discussed herein may perform, according to an embodiment.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processor circuitry executing code and/or instructions sets (e.g., software, firmware, etc.) corresponding to the functionality described herein, thus transforming a general-purpose processor into a specific-purpose processing environment to perform one or more of the operations described herein. In some embodiments, the processor circuitry may be embodied as a stand-alone integrated circuit or may be incorporated as one of several components on an integrated circuit. In some embodiments, the various components and circuitry of the node or other systems may be combined in a system-on-a-chip (SoC) architecture FIG. 9 is a block diagram illustrating a machine in the example form of a computer system 900, within which a set or sequence of instructions may be executed to cause the machine to perform any one of the methodologies discussed herein, according to an embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a head-mounted display, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A, 5G, DSRC, or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a road controller system comprising: a data store to store an active traffic policy; a processor subsystem to: determine a speed or platoon size of a vehicle platoon traveling on an area controlled by the road controller system; and determine a change to the speed or platoon size of the vehicle platoon, the change based on the active traffic policy; and a transceiver to transmit a control message to the vehicle platoon to implement the change to the speed or platoon size of the vehicle platoon.

In Example 2, the subject matter of Example 1 includes, wherein the active traffic policy is updated from a road controller broker.

In Example 3, the subject matter of Example 2 includes, wherein the processor subsystem is to: determine that the road controller broker is unavailable; and activate a default policy as the active traffic policy when the road controller broker is unavailable.

In Example 4, the subject matter of Examples 1-3 includes, wherein the active traffic policy is managed by the road controller system.

In Example 5, the subject matter of Examples 1-4 includes, wherein the active traffic policy is accessed from a road controller broker, the road controller broker controlling a plurality of road controllers including the road controller system.

In Example 6, the subject matter of Examples 1-5 includes, wherein the active traffic policy includes rules to control traffic in a residential area to reduce noise pollution of vehicle platoons operating in the residential area.

In Example 7, the subject matter of Examples 1-6 includes, a sensor array interface to receive sensor data.

In Example 8, the subject matter of Example 7 includes, wherein the sensor data includes weather data, and wherein to determine the change to the speed or platoon size of the vehicle platoon, the processor subsystem is to use the weather data to determine the change.

In Example 9, the subject matter of Examples 7-8 includes, wherein the sensor data includes road condition data, and wherein to determine the change to the speed or platoon size of the vehicle platoon, the processor subsystem is to use the road condition data to determine the change.

Example 10 is a method of operating a road controller system, the method comprising: accessing an active traffic policy; determining a speed or platoon size of a vehicle platoon traveling on an area controlled by the road controller system; determining a change to the speed or platoon size of the vehicle platoon, the change based on the active traffic policy; and transmitting a control message to the vehicle platoon to implement the change to the speed or platoon size of the vehicle platoon.

In Example 11, the subject matter of Example 10 includes, wherein the active traffic policy is updated from a road controller broker.

In Example 12, the subject matter of Example 11 includes, determining that the road controller broker is unavailable; and activating a default policy when the road controller broker is unavailable.

In Example 13, the subject matter of Examples 10-12 includes, wherein the active traffic policy is managed by the road controller system.

In Example 14, the subject matter of Examples 10-13 includes, accessing the active traffic policy from a road controller broker, the road controller broker controlling a plurality of road controllers including the road controller system.

In Example 15, the subject matter of Examples 10-14 includes, wherein the active traffic policy includes rules to control traffic in a residential area to reduce noise pollution of vehicle platoons operating in the residential area.

In Example 16, the subject matter of Examples 10-15 includes, receiving sensor data from a sensor array interface incorporated in the road controller system.

In Example 17, the subject matter of Example 16 includes, wherein the sensor data includes weather data, and wherein determining the change to the speed or platoon size of the vehicle platoon comprises using the weather data to determine the change.

In Example 18, the subject matter of Examples 16-17 includes, wherein the sensor data includes road condition data, and wherein determining the change to the speed or platoon size of the vehicle platoon comprises using the road condition data to determine the change.

Example 19 is at least one machine-readable medium, including instructions for operating a road controller system, which when executed on a machine, cause the machine to perform the operations comprising: accessing an active traffic policy; determining a speed or platoon size of a vehicle platoon traveling on an area controlled by the road controller system; determining a change to the speed or platoon size of the vehicle platoon, the change based on the active traffic policy; and transmitting a control message to the vehicle platoon to implement the change to the speed or platoon size of the vehicle platoon.

In Example 20, the subject matter of Example 19 includes, wherein the active traffic policy is updated from a road controller broker.

In Example 21, the subject matter of Example 20 includes, determining that the road controller broker is unavailable; and activating a default policy when the road controller broker is unavailable.

In Example 22, the subject matter of Examples 19-21 includes, wherein the active traffic policy is managed by the road controller system.

In Example 23, the subject matter of Examples 19-22 includes, accessing the active traffic policy from a road controller broker, the road controller broker controlling a plurality of road controllers including the road controller system.

In Example 24, the subject matter of Examples 19-23 includes, wherein the active traffic policy includes rules to control traffic in a residential area to reduce noise pollution of vehicle platoons operating in the residential area.

In Example 25, the subject matter of Examples 19-24 includes, receiving sensor data from a sensor array interface incorporated in the road controller system.

In Example 26, the subject matter of Example 25 includes, wherein the sensor data includes weather data, and wherein determining the change to the speed or platoon size of the vehicle platoon comprises using the weather data to determine the change.

In Example 27, the subject matter of Examples 25-26 includes, wherein the sensor data includes road condition data, and wherein determining the change to the speed or platoon size of the vehicle platoon comprises using the road condition data to determine the change.

Example 28 is an apparatus for operating a road controller system, the apparatus comprising: means for accessing an active traffic policy; means for determining a speed or platoon size of a vehicle platoon traveling on an area controlled by the road controller system; means for determining a change to the speed or platoon size of the vehicle platoon, the change based on the active traffic policy; and means for transmitting a control message to the vehicle platoon to implement the change to the speed or platoon size of the vehicle platoon.

In Example 29, the subject matter of Example 28 includes, wherein the active traffic policy is updated from a road controller broker.

In Example 30, the subject matter of Example 29 includes, means for determining that the road controller broker is unavailable; and means for activating a default policy when the road controller broker is unavailable.

In Example 31, the subject matter of Examples 28-30 includes, wherein the active traffic policy is managed by the road controller system.

In Example 32, the subject matter of Examples 28-31 includes, means for accessing the active traffic policy from a road controller broker, the road controller broker controlling a plurality of road controllers including the road controller system.

In Example 33, the subject matter of Examples 28-32 includes, wherein the active traffic policy includes rules to control traffic in a residential area to reduce noise pollution of vehicle platoons operating in the residential area.

In Example 34, the subject matter of Examples 28-33 includes, means for receiving sensor data from a sensor array interface incorporated in the road controller system.

In Example 35, the subject matter of Example 34 includes, wherein the sensor data includes weather data, and wherein the means for determining the change to the speed or platoon size of the vehicle platoon comprise means for using the weather data to determine the change.

In Example 36, the subject matter of Examples 34-35 includes, wherein the sensor data includes road condition data, and wherein the means for determining the change to the speed or platoon size of the vehicle platoon comprise means for using the road condition data to determine the change.

Example 37 is at least one machine-readable medium including instructions that, when executed by processing circuitry, cause the processing circuitry to perform operations to implement of any of Examples 1-36.

Example 38 is an apparatus comprising means to implement of any of Examples 1-36.

Example 39 is a system to implement of any of Examples 1-36.

Example 40 is a method to implement of any of Examples 1-36.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A road controller system including a plurality of road controllers, comprising:
    a data store to store an active traffic policy, the active traffic policy including rules to control traffic in a controlled area to reduce noise pollution of vehicle platoons;
    a sensor array interface to receive sensor data, the sensor data including road condition data;
    a processor subsystem to:
        access a status message received from a vehicle platoon traveling on an area controlled by a road controller of the plurality of road controllers in the road controller system, the status message including a platoon identifier and a number of vehicles in the vehicle platoon, and the status message transmitted to the road controller when the vehicle platoon enters the area controlled by the road controller;
        determine a platoon size of the vehicle platoon based on the status message received from the vehicle platoon;
        determine a change to the platoon size of the vehicle platoon, the change to the platoon size based on the active traffic policy and the road condition data; and
        cause transmission of a control message to the vehicle platoon to implement the change to the platoon size of the vehicle platoon.

2. The system of claim 1, wherein the active traffic policy is updated from a road controller broker.

3. The system of claim 2, wherein the processor subsystem is to:

determine that the road controller broker is unavailable; and activate a default policy as the active traffic policy when the road controller broker is unavailable.

4. The system of claim 1, wherein the active traffic policy is managed by the road controller system.

5. The system of claim 1, wherein the active traffic policy is accessed from a road controller broker, the road controller broker controlling the plurality of road controllers in the road controller system.

6. The system of claim 1, wherein the rules to control traffic in the controlled area include rules to control traffic in a residential area to reduce noise pollution of vehicle platoons operating in the residential area.

7. The system of claim 1, wherein the sensor data further includes weather data, and wherein the determined change to the platoon size is further based on the weather data.

8. A method of operating a platoon with a road controller system, performed by a road controller of a plurality of road controllers in the road controller system, the method comprising:

accessing an active traffic policy, the active traffic policy including rules to control traffic in a controlled area to reduce noise pollution of vehicle platoons;

receiving sensor data from a sensor array interface of the road controller system, the sensor data including road condition data;

receiving a status message received from a vehicle platoon traveling on an area controlled by the road controller, the status message including a platoon identifier and a number of vehicles in the vehicle platoon, and the status message transmitted to the road controller when the vehicle platoon enters the area controlled by the road controller;

determining a platoon size of the vehicle platoon based on the status message received from the vehicle platoon;

determining a change to the platoon size of the vehicle platoon, the change to the platoon size based on the active traffic policy and the road condition data; and transmitting a control message to the vehicle platoon to implement the change to the platoon size of the vehicle platoon.

9. The method of claim 8, wherein the active traffic policy is updated from a road controller broker.

10. The method of claim 9, further comprising:

determining that the road controller broker is unavailable; and activating a default policy when the road controller broker is unavailable.

11. The method of claim 8, wherein the active traffic policy is managed by the road controller system.

12. The method of claim 8, further comprising:

accessing the active traffic policy from a road controller broker, the road controller broker controlling the plurality of road controllers in the road controller system.

13. The method of claim 8, wherein the rules to control traffic in the controlled area include rules to control traffic in a residential area to reduce noise pollution of vehicle platoons operating in the residential area.

14. The method of claim 8, wherein the sensor data includes weather data, and wherein determining the change to the platoon size of the vehicle platoon comprises using the weather data to determine the change.

15. The method of claim 8, wherein the sensor data includes road condition data, and wherein determining the change to the platoon size of the vehicle platoon comprises using the road condition data to determine the change.

16. At least one non-transitory machine-readable medium, including instructions for operating a platoon with a road controller system, which when executed on a machine for a road controller of a plurality of road controllers in the road controller system, cause the machine to perform the operations comprising:

accessing an active traffic policy, the active traffic policy including rules to control traffic in a controlled area to reduce noise pollution of vehicle platoons;

receiving sensor data from a sensor array interface of the road controller system, the sensor data including road condition data;

receiving a status message received from a vehicle platoon traveling on an area controlled by the road controller, the status message including a platoon identifier and a number of vehicles in the vehicle platoon, and the status message transmitted to the road controller when the vehicle platoon enters the area controlled by the road controller;

determining a platoon size of the vehicle platoon based on the status message received from the vehicle platoon; and determining a change to the platoon size of the vehicle platoon, the change to the platoon size based on the active traffic policy and the road condition data; and transmitting a control message to the vehicle platoon to implement the change to the platoon size of the vehicle platoon.

17. The machine-readable medium of claim 16, wherein the active traffic policy is updated from a road controller broker.

18. The machine-readable medium of claim 17, further comprising:

determining that the road controller broker is unavailable; and activating a default policy when the road controller broker is unavailable.

19. The machine-readable medium of claim 16, wherein the active traffic policy is managed by the road controller system.

20. The machine-readable medium of claim 16, further comprising:

accessing the active traffic policy from a road controller broker, the road controller broker controlling the plurality of road controllers in the road controller system.

21. The machine-readable medium of claim 16, wherein the rules to control traffic in the controlled area include rules to control traffic in a residential area to reduce noise pollution of vehicle platoons operating in the residential area.

22. The machine-readable medium of claim 16, further comprising receiving sensor data from a sensor array interface incorporated in the road controller system.

* * * * *